United States Patent
Fitzpatrick et al.

(10) Patent No.: US 7,313,615 B2
(45) Date of Patent: Dec. 25, 2007

(54) COMMUNICATIONS MANAGEMENT USING WEIGHTS AND THRESHOLDS

(75) Inventors: Gregory P Fitzpatrick, Keller, TX (US); Tsz (Simon) Cheng, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/462,425

(22) Filed: Jun. 16, 2003

(65) Prior Publication Data
US 2004/0255015 A1 Dec. 16, 2004

(51) Int. Cl.
G06F 15/173 (2006.01)
G06F 15/16 (2006.01)

(52) U.S. Cl. ............... 709/223; 709/235

(58) Field of Classification Search ........ 709/223, 709/235, 230
See application file for complete search history.

(56) References Cited

U.S. PATENT DOCUMENTS

| | | | |
|---|---|---|---|
| 5,377,354 A * | 12/1994 | Scannell et al. ...... 718/103 |
| 6,442,589 B1 * | 8/2002 | Takahashi et al. ...... 709/203 |
| 6,493,696 B1 * | 12/2002 | Chazin ...... 706/47 |
| 6,577,597 B1 * | 6/2003 | Natarajan et al. ...... 370/232 |
| 7,167,910 B2 * | 1/2007 | Farnham et al. ...... 709/223 |
| 2003/0084109 A1 * | 5/2003 | Balluff ...... 709/206 |
| 2005/0251560 A1 * | 11/2005 | Horvitz ...... 709/206 |

* cited by examiner

Primary Examiner—Jason Cardone
Assistant Examiner—Brian J Gillis
(74) Attorney, Agent, or Firm—Akerman Senterfitt

(57) ABSTRACT

A method for managing communications including receiving a multitude of communication attempts from a multitude of communication sources. For each communication attempt, a communication event can be responsively determined. For each communication event, an event weight for the communication event can be determined. Each event weight can be compared to an event threshold associated with the communication event. At least one communication management action can be responsively performed. The communication management action can include a busy indication action, a queuing action, an automated response action, a linking action, a notification action, and/or a reformatting action.

24 Claims, 4 Drawing Sheets

COMMUNICATIONS MANAGEMENT USING WEIGHTS AND THRESHOLDS

BACKGROUND OF THE INVENTION

1. Technical Field

The present invention relates to the field of communications and, more particularly, to communications management.

2. Description of the Related Art

Communication advances have resulted in numerous communication channels being routinely employed for interpersonal contacts. Common communication channels include, but are not limited to, emailing, telephoning, chatting via the Internet, instant messaging, video teleconferencing, and faxing. The various communication channels, many of which are extremely easy to use in a cost efficient manner, have resulted in a large volume of routinely conveyed messages being delivered to individuals.

Appropriately handling this large volume of incoming messages can be a daunting and time consuming task. Indeed, appropriately handling the messages can require an individual to prioritize received messages in order of urgency. Prioritizing messages, however, can force individuals to repetitively sift through the various available communication channels though which messages arrive. Further complicating matters is the increase in the difficulty of the sifting is increased by direct marketing practices, such as email solicitation and telemarketing, which can fill up voice mailboxes, answering machines, and email boxes with lengthy, unwanted messages.

Some users needlessly waste valuable time repetitively checking voicemail messages, email, faxes, postal mail, cellular messages, and other recipient communication devices for fear of missing a critical message. Other users, however, inadvertently miss important information or fail to respond in a timely fashion because a particular recipient device was not checked often enough.

Communication difficulties are further intensified by the number of different communication sources and applications available for each communication channel. Alternatively, different sources can exist for instant messaging, receiving faxes, receiving telephone calls, email, and the like. For example, a student can have one email account for school, one for personal messages, and another for a part-time job. The student can, therefore, be forced to check three different email accounts just to receive the student's email messages. Similarly, different recipient devices and/or different software applications can exist for instant message channels, fax channels, telephony channels, and the like.

SUMMARY OF THE INVENTION

The invention disclosed herein provides a method, a system, and an apparatus for managing incoming communications. In particular, a multitude of communication attempts targeting a communication recipient can be routed to a communication manager. For each received communication attempt, a related communication event can be determined. The communication manager can determine the relative urgency of each communication attempt by determining an event weight for the communication event and comparing the event weight to a predetermined set of event thresholds. A series of communication actions can be responsively performed in real-time based upon the comparison.

For example, if an event weight exceeds an event threshold associated with an email notification action, the recipient can be notified that a new email message has been received. If the event weight falls below the event threshold, however, the email can be placed in an email queue to be perused at the leisure of the recipient and no notification will explicitly result.

One aspect of the present invention can include a method for managing communications. The method includes determining an event weight for a communication event, comparing the event weight with an event threshold associated with the communication event, and performing at least one communication management action responsive to the comparing step. The communication management action can include a busy indication action, a queuing action, an automated response action, a linking action, a notification action, and/or a reformat action. Multiple event thresholds, each associated with specified communication events, can be defined for a single communication event. In one embodiment, an event exception can be detected and at least one event weight and/or event threshold can be responsively adjusted. In another embodiment, a management control condition can be detected and at least one event weight and/or event threshold can be temporarily adjusted in response.

Further, a communication attempt intended for a communication recipient can be received from a communication source. The communication event can be responsively determined based at least in part upon the received communication attempt. Multiple communication attempts can be received from multiple communication sources. Additionally, different ones of the communication attempts can be associated with different communication channels. In one embodiment, the event weight can be determined based at least in part upon an identity of the communication source from which the communication attempt was received. Notably, the communication attempt can be intercepted before a connection is established with the intended communication recipient. Moreover, the communication attempt can be intended for a specific recipient device associated with the communication recipient. Additionally, at least one communication management action can be performed that utilizes a different recipient device than the one specified by the communication source.

Another aspect of the present invention includes a system for managing communications. The system can include a communication manager configured to intercept incoming communications before the communications reach an intended recipient. The communication manager can automatically perform a multitude of communication actions responsive to the incoming communications. Each of the communication actions can be performed based upon a comparison of at least one event weight to at least one predetermined threshold value. Notably, different ones of the incoming communications can be associated with different communication channels. Further, the system can include an integrator configured to notify the intended recipient of at least a portion of the incoming communications. The notification can occur via a single interface even though different incoming communications can be targeted for different receiving communication devices.

Yet another aspect of the present invention can include a system for managing communications. The system can include a means for determining an event weight for a communication event, a means for comparing the event weight with an event threshold associated with the communication event, and a means for performing at least one communication management action responsive to the comparing step.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, system, and apparatus for managing communications. More particularly, the present invention provides a unified communication management system capable of receiving messages from disparate communication sources and communication channels and responsively performing a variety of communication actions. The communication actions can include, for example, a busy indication action, a queuing action, an automated response action, a linking action, a notification action, and/or a reformat action. Appropriate communication actions can be determined in real-time by comparing an event weight associated with a received message with at least one predetermined event threshold.

Figure 1:
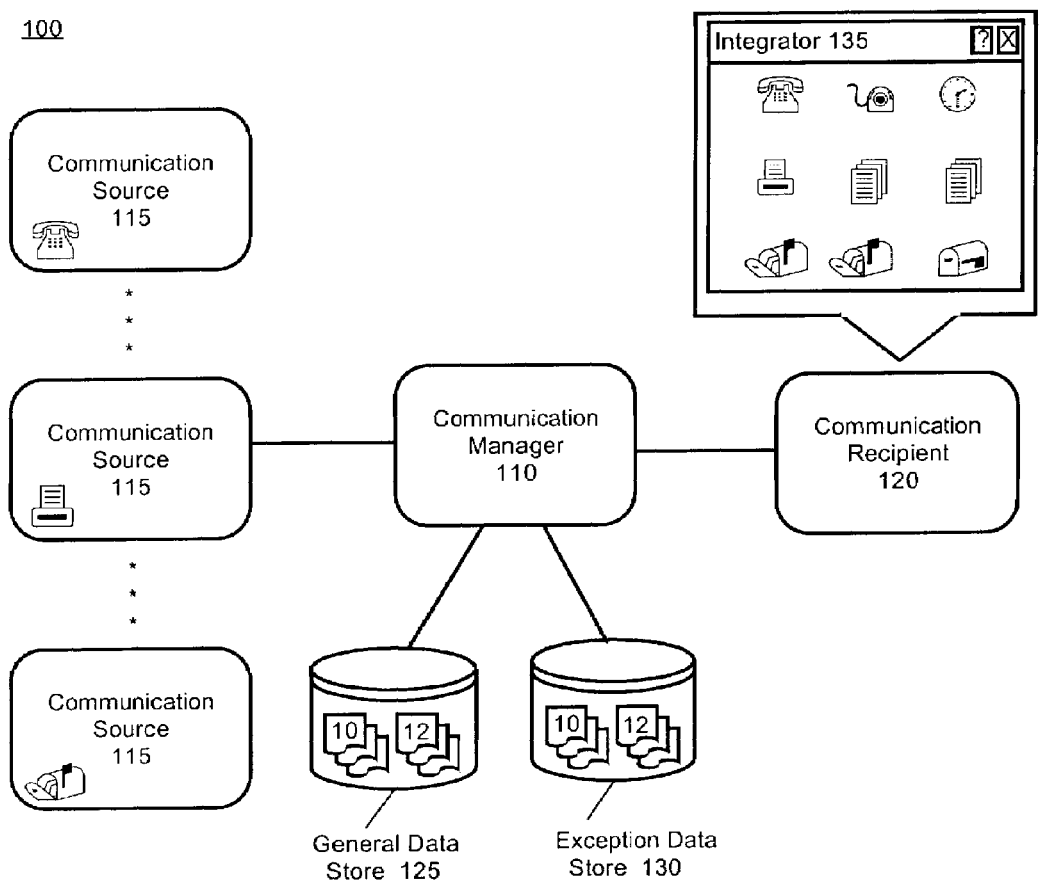
FIG. 1 is a schematic diagram illustrating an exemplary communications management system in accordance with the inventive arrangements disclosed herein.

FIG. 1 is a schematic diagram illustrating an exemplary communications management system 100 in accordance with the inventive arrangements disclosed herein. The system 100 can include a communication manager 110, at least one communication source 115, a communication recipient 120, a general data store 125, an exception data store 130, and an integrator 135. The communication manager 110 can be capable of detecting a communication event, such as the arrival of a new message, and automatically performing a communication action, such as providing a message notification. The communication events detected by the communication manager 110 are related to inbound messages.

The communication manager 110 can be a network element linked to a telecommunication system and/or communications server. Alternately, the communications manager 110 can be a client-based application or series of applications operating within one or more computing devices. In one embodiment, the communication manager 110 can be enacted in a recipient only fashion, requiring no modifications to the protocols, hardware, and/or software of the various communication sources 115.

The communication source 115 can represent an entity capable of utilizing one or more originating communication devices to convey information to one or more recipient communication devices. The communication source 115 need not be an individual, but can instead represent an automated device and/or software application. For example, the communication source 115 can be a telemarketing auto-dialing device or an automated emailing application. Any entity capable of originating a message in any form to the communication recipient 120 can be a communication source 115.

The communication recipient 120 represents a single message receiving entity. The entity can be an individual, a corporation, a position, and/or organization. Further, multiple recipient communication devices, such as email accounts, fax machines, telephones, and pagers, can be associated with the entity represented by the communication recipient 120.

The integrator 135 can be an interface capable of notifying the communication recipient 120 that a communication source 115 has attempted to communicate. The integrator 135 can function as a centralized notification point for all the recipient communication devices associated with the communication recipient 120. In one embodiment, the integrator 135 can include log information concerning all communication events, the times of the communication events, the communication sources 115 associated with the communication events, and the targeted recipient communication devices. The log information can be grouped in a variety of ways, such as by time, communication source, and/or recipient communication device.

Additionally, in one embodiment, the integrator 135 can provide an interface through which the communication recipient 120 can modify system 100 behavior. For example, the communication recipient 120 can adjust event weights and/or event thresholds via the integrator 135. Alternatively, the communication recipient 120 can associate selected communication actions and/or communication sources 115 with communication events. In another example, the communication recipient 120 can use the integrator 135 to define management control conditions capable of temporarily adjusting event weights and/or event thresholds. Accordingly, the integrator 135 can be a centralized access and control point through which the communication recipient 120 can interact with and alter the behavior of the communication manager 110.

The general data store 125 can be an information repository for storing rules and related parameters that are utilized by the communication manager 110. The general data store 125 can store event weights 10, which are associated with particular communication sources 115. Further, the general data store 125 can store threshold values 12 and associated communication actions.

The exception data store 125 can be an information repository for storing exceptions to general rules utilized by the communication manager 110. The exception data store 130 can store event weights 10, threshold values 12, and other such information.

Before the communication manager 110 can be utilized by the communication recipient 120, necessary parameter values within the communication manager 110 must be initialized. One step in this initialization process involves registering recipient communication devices associated with the communication recipient 120. Registering a recipient communication device can include establishing a device identifier and providing a device driver for the recipient device. A device driver can convert input/output instructions from a format native to the communication manager 120 into messages that the recipient device can properly interpret. Device drivers are commonly included within popular software operating systems and computing devices and typically have such file name suffixes as ".dll," ".exe," and ".vxd." In one embodiment, the communication manager 110 can automatically interrogate communicatively linked devices to initially establish a set of registered recipient communication devices. Alternatively or conjunctively, a communication recipient 120 can manually register and/or alter the registration entries of one or more recipient communication devices.

The next step in the initiation process is to establish communication events and assign relative event weights 10 to each communication event. In one embodiment, a communication event can be automatically established for each registered recipient communication device along with a suggested or default event weight. In another embodiment, communication events can be established for each communication channel, such as a telephone channel, a fax channel, an email channel, and the like. In yet another embodiment, communication events can be established based on specified communication sources 115. In fact, a communication event can be established in any manner so long as incoming communication attempts can be associated with a unique, predetermined communication event having a predetermined event weight. Once communication events are established, the communication recipient 120 can manually provide and/or alter default event weights 10 associated with each communication event.

The next initialization stage involves establishing event threshold 12 values and corresponding communication actions. Each communication event should be comparable against one or more event thresholds 12. Further, each event threshold 12 can be associated with one or more communication actions, which are triggered whenever the event weight 10 exceeds an established value for the event threshold 12. A series of default event thresholds 12 and default communication actions can be provided by the communication manager 110. Alternatively or conjunctively, the communication recipient 120 can manually provide values for event thresholds 12 and establish triggerable communication actions.

In operation, a communication source 115 can initialize a communication to a targeted recipient communication device associated with the communication recipient 120. The communication manager 110 can intercept the communication attempt and determine a communication event corresponding to the communication attempt. Then, an event weight 10 for the communication event can be compared against an appropriate event threshold 12 value. If the event weight 10 exceeds the event threshold 12, one or more communication actions can be triggered.

For example, the triggered communication action can be a notifying action that occurs via the integrator 135. The integrator 135 can responsively present a visual and/or audio indication to the communication recipient 120. Additional communication actions can conjunctively occur. For example, if the communication event related to the delivery of an email message, an email message can be delivered to a selected email application of the communication recipient 120.

Figure 2:
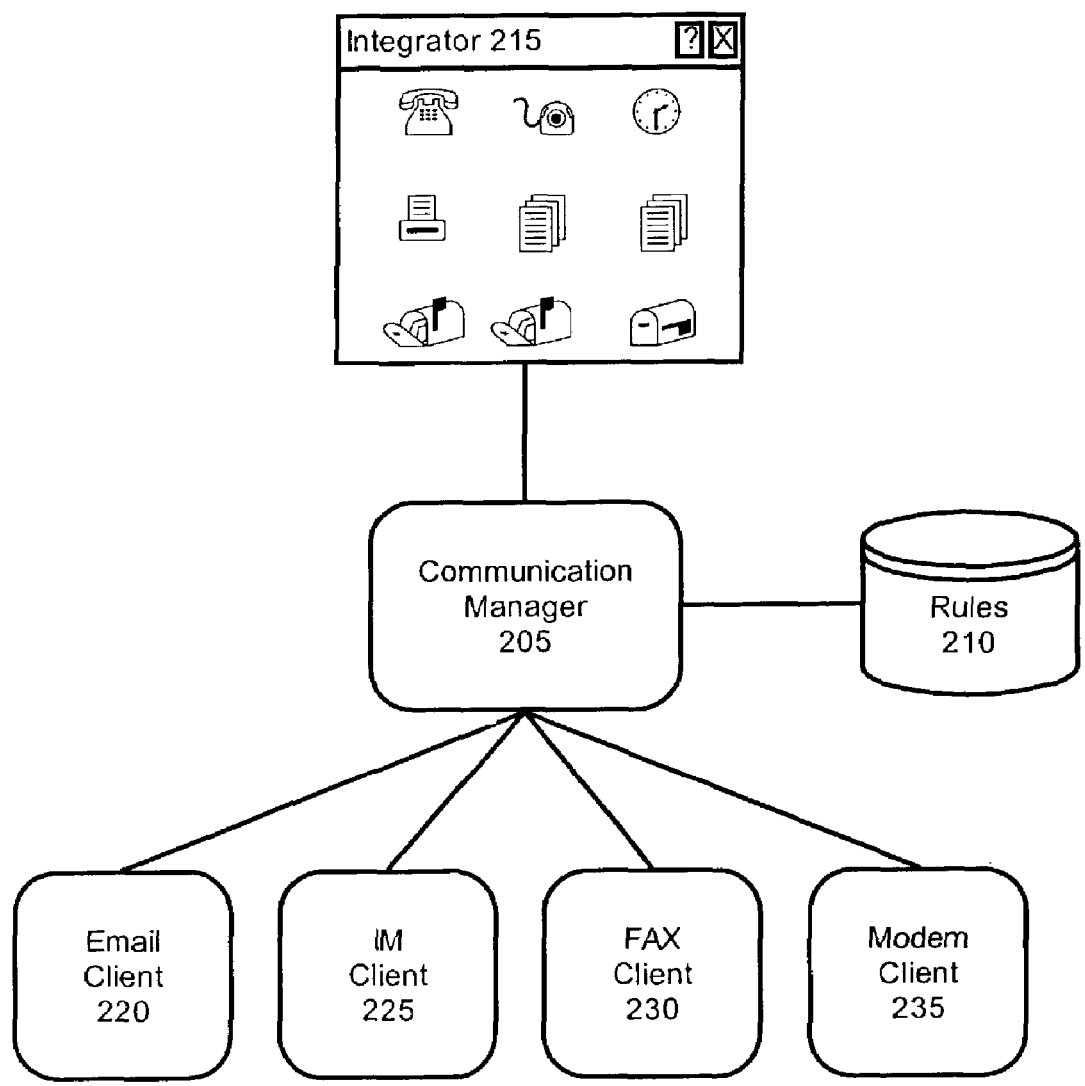
FIG. 2 is another schematic diagram illustrating an exemplary communications management system in accordance with the inventive arrangements disclosed herein.

FIG. 2 is another schematic diagram illustrating an exemplary communications management system 200 in accordance with the inventive arrangements disclosed herein. The system 200 can include a communications manager 205 and a rules data store 210. The communication manager 205 can manage communications for a plurality of different client applications and/or devices each associated with the same communications recipient. For example, in one embodiment, the communication manager 205 can be disposed within a computing device and/or distributed computing system and manage communications for various recipient communication devices, such as an email client 220, an instant messenger (IM) client 225, a fax client 230, a modem client 235, and the like. A single unified interface, an integrator 215, can be presented to the communication recipient and/or an administrator of the communication manager 205.

The rules data store 210 can contain data and algorithms used by the communication manager 205 in routing communications and performing communication actions. For example, the rules data store 210 can include a plurality of event weights, event thresholds, and associated communication events. Further, the rules data store 210 can include device drivers, application program interfaces (APIs), and the like that provide communication specifications for recipient communication devices. For example, the rules data store 210 can contain an API for the IM client 225, thereby providing the communication manager 205 with a means for receiving messages from and directing messages to the IM client 225. In another example, the rules data store 210 can contain a device driver for the modem client 235, thereby providing the communication manager 205 a means for interacting with a communicatively linked modem.

Figure 3:
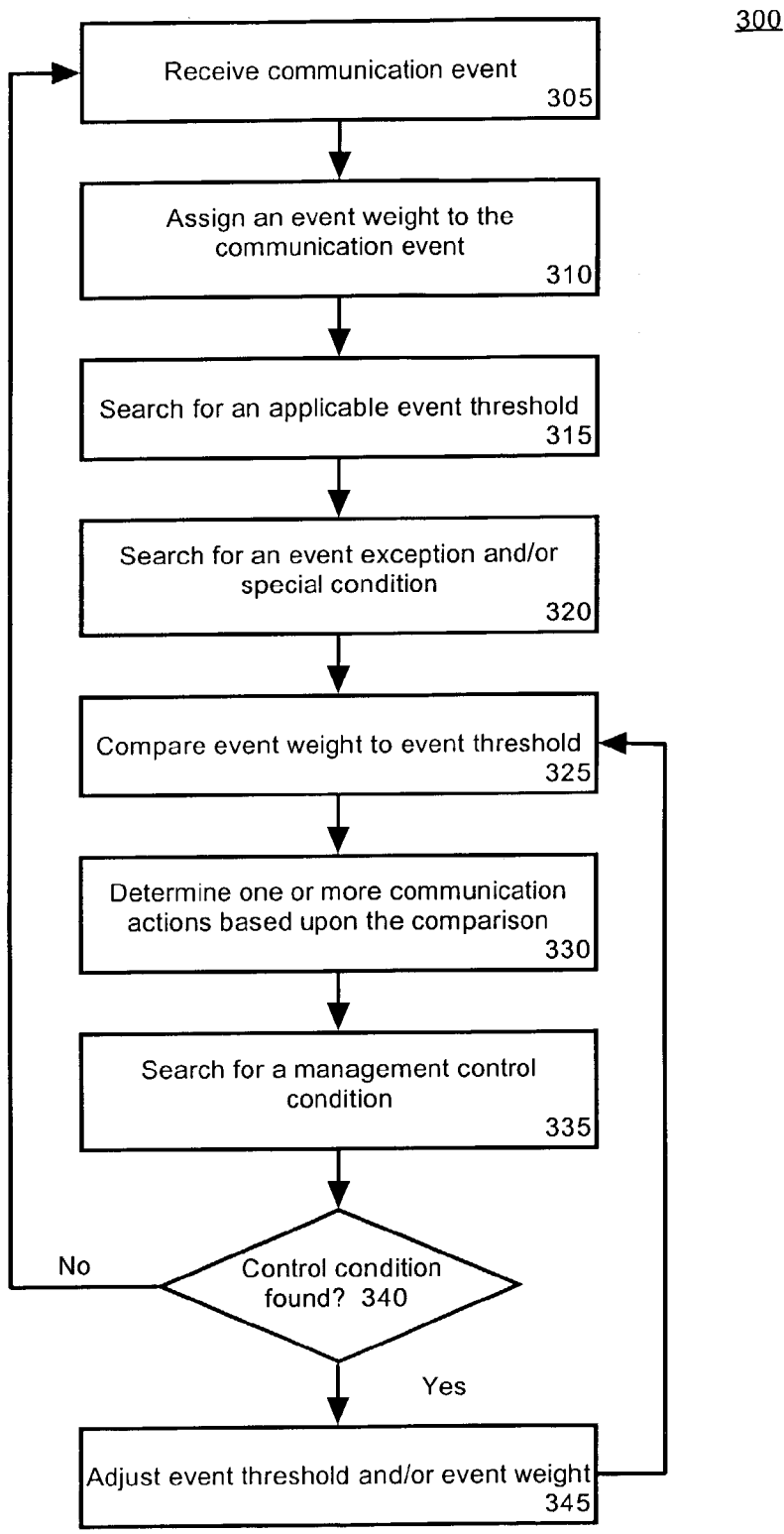
FIG. 3 is a flow chart illustrating a method of managing communications using the system of FIG. 1.

FIG. 3 is a flow chart illustrating a method 300 of managing communications using the system of FIG. 1. The method 300 can be performed in the context of a communications management system. All incoming messages from communication sources can be routed through the communications management system before any messages are conveyed to the intended communication recipient. The method can begin in step 305 where a communication event is received. The communication event can represent the receipt of a message or any other attempt to establish a communication connection with the communication recipient. For example, the communications event can result from the reception of a telephone call, a page, a chat request, an email, and the like.

In step 310, an event weight can be assigned to the communication event. The event weight can be a predetermined value associated with a particular communication source, communication event, and/or recipient communication device. In step 315, an event threshold, which is another value, can be determined. Event thresholds either can be generally applicable or can be associated with a specified communication channel and/or communication event. For example, an event threshold associated with a message notification action to the integrator 135 described in FIG. 1 can be a generically applicable event threshold. In contrast, an event threshold for establishing a telephony connection with a receiving communication device can be limited to telephony communication events.

In step 320, an event exception handler can be searched for pre-established events and/or special conditions. For example, an exception could be established that increases the event weight assigned to an email receiving event whenever a third email is received from a given communication source within a predetermined period. In another example, a 'time out' condition can be established to adjust an event weight whenever a communication source has been waiting within a queue for a predetermined period. Such a time out condition can assure customers will always be connected to an agent within a specified time period, thereby preventing undue customer frustration.

In step 325, the event weight can be compared to one or more event thresholds. If the event weight exceeds the event threshold, then a communication action associated with the event threshold can be triggered. Accordingly, in step 330, one or more communication actions can be determined based upon the comparisons performed in step 325. A single communication event can be compared with multiple event thresholds resulting in multiple communication actions being performed by the communication manager.

In step 335, a determination can be made concerning a management control condition. A management control condition can be any condition signifying that pre-established event weights and/or event thresholds should be temporarily adjusted. For example, one management control condition can indicate that the communication recipient is presently talking on the telephone. The management control condition can result in all event threshold values being increased by a predetermined factor for the duration of the telephone call to prevent needless interruptions while the communication recipient is talking. In another example, a management condition can disfavor communication events occurring during a previously established time interval, such as during a lunch period. Again, threshold values can be upwardly adjusted to prevent needless interruptions, yet still permitting important communications, which have high associated event weights that exceed the adjusted threshold values.

In step 340, if no management control conditions are discovered, the method can proceed to step 305, where the method can monitor for and react to new communication events. In step 345, if a management control condition is found, then the method can proceed to step 345. In step 345, event thresholds and/or event weights can be adjusted in the manner indicated by the management control condition. Since the adjustment in step 345 may have altered conditions relating to pending communication events, the method can proceed to step 325 were event weights and event thresholds for pending communication events can again be compared and appropriate communication actions taken. The method can proceed through the subsequent steps until reaching step 305, where the method can monitor for and react to new communication events. The adjustments made in step 345 will persist until the temporary management control condition causing the adjustments expires or until a different management control condition occurs.

Figure 4:
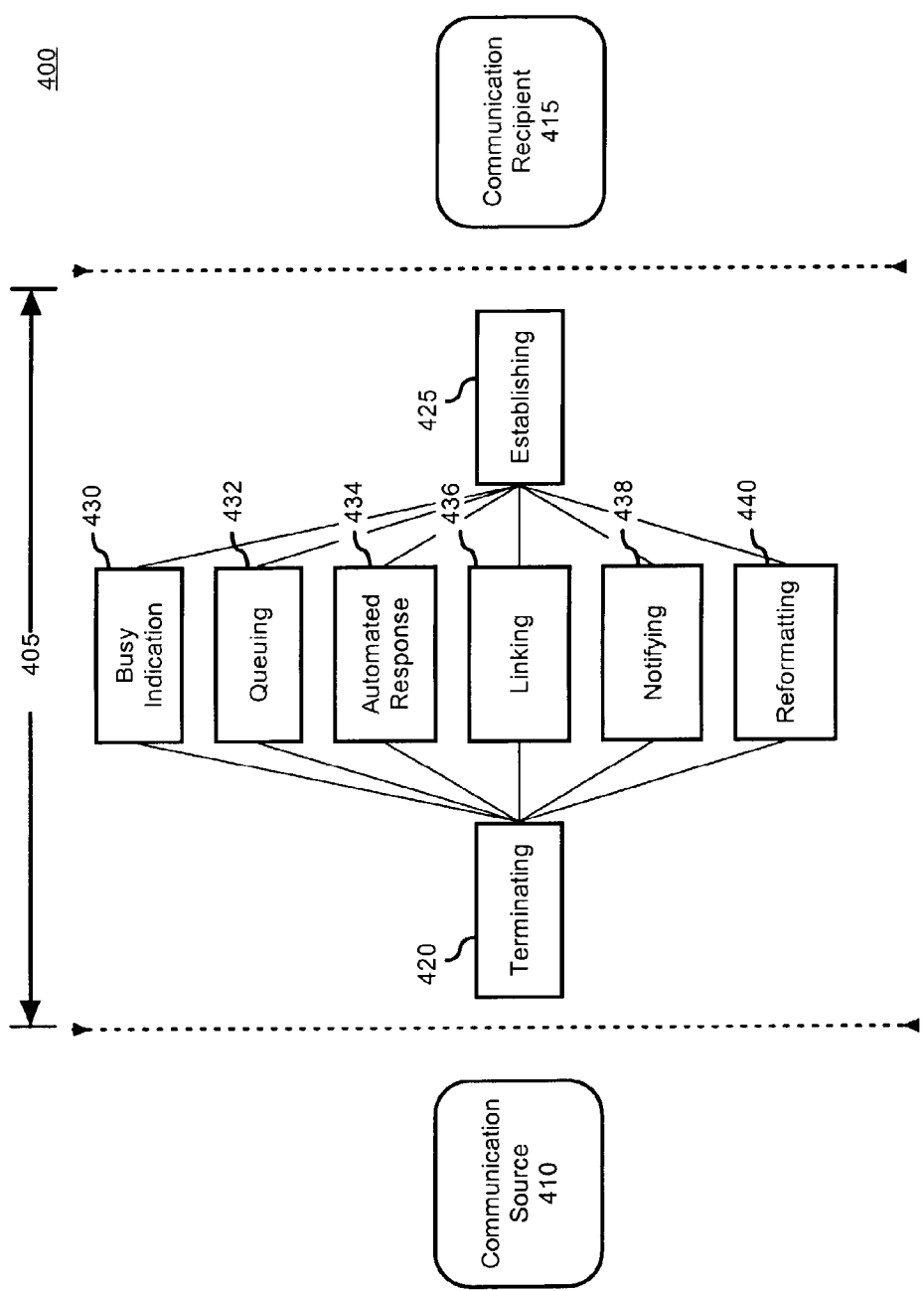
FIG. 4 is a schematic diagram illustrating exemplary communication actions that the communications management system of FIG. 1 is capable of performing.

FIG. 4 is a schematic diagram 400 illustrating exemplary communication actions that the communications management system of FIG. 1 is capable of performing. Diagram 400 can include a communication manager 405 capable of conducting one or more communication actions. Communication actions can include, but are not limited to, such actions as a busy indication 430 action, a queuing 432 action, an automated response 434 action, a linking 436 action, a notifying 438 action, and a reformatting 440 action. The communication actions taken by the communication manager 405 are responsive to incoming communications. Accordingly, the communication manager 405 can be bypassed for outgoing communications that are initiated by the communication recipient 415.

The busy indication 430 informs the communication source 410 that the desired recipient device is not presently available. For example, if the recipient device is a telephone, a busy signal can be audibly relayed to the communication source. Alternatively, if the recipient device is a chat application, the busy indication 430 can consist of a message that the requested recipient is not presently on-line or available to chat. The busy indication 430 can be a user-configurable message and/or signal that can be the same or different from the default busy indication associated with the recipient device.

Queuing 432 can result in the communication attempt being queued. In one embodiment, user-configurable queuing options can exist, such as selectively providing different queuing algorithms. In another embodiment, users can establish preferential communication sources 410 with queuing priority over other, non-preferred, communication sources 410. If the communication attempt solicits real-time interaction with the communication recipient 415, then a queue message can be provided to the communication source 410. The queue message can state an estimated wait time before a communication connection can be established.

The automated response 434 can also be provided to the communication source 410. This automated response 434 can be a user-configured response targeted for a particular communication source 410.

The linking 436 action can establish a connection between the communication source 410 and the communication recipient 415. The established connection need not be the recipient device requested by the communication source 410. For example, the communication source 410 can request a particular recipient device associated with the dialed telephone number. The linking 436 action can connect the communication source 410 to different recipient device, such as cellular telephone of the communication recipient 415. In another example, an email message targeted to one recipient email account can be redirected to a different email account selected by the communication recipient 415 via predefined settings established within the communication manager 405.

The notifying 438 action can provide an indication to the communication recipient 415 that a communication attempt has occurred. The notifying 438 action can utilize any recipient device associated with the communication recipient 415 and need not utilize a recipient device that the communication source 410 has attempted to contact.

The reformatting 440 action can be performed whenever the originating communication device and the recipient communication device communicate via incompatible message formats. The reformatting 440 action can be important in situations where the communication manager 405 directs the communication source 410 from a target recipient device to an alternate recipient device.

Two special actions that can be performed by the communication manager 405 include a terminating 420 action and an establishing 425 action. The terminating 420 action allows the communication manager 405 to function as a receiving entity for the communication attempt of the communication source 410. That is, the terminating 420 action allows the communication manager 405 to intercept a communication from the communication source 410 by functioning as though the communication manager 405 were the targeted recipient communication device. Hence, the terminating 420 action emulates the targeted receiving device and acts as the termination point for purposes of establishing a communication link between the communication source 115 and the communication manager 110.

The establishing 425 action allows the communication manager 405 to initialize a communication connection with a selected one of the recipient communication devices. Accordingly, the establishing 425 action can emulate the communication source 410. If the communication manager 405 is simultaneously performing the terminating 420 and the establishing 425 actions for a related communication event, a linking action 436 of establishing a cross connection can sometimes be performed. A cross connection action causes the communication source 410 participating in the terminating action 420 to be communicatively linked to the recipient communication device participating in the establishing 425 action. Once the cross connection action has been performed, a communication channel independent of the communication manager 405 can be created and the terminating 420 and establishing 425 actions can be ended.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for managing communications comprising the steps of:
   receiving a plurality of communication attempts from a plurality of communication sources;
   for each communication attempt, responsively determining a plurality of corresponding communication events, the plurality of communication events comprising, for each communication attempt, a communication event indicating a communication source of the communication attempt, another communication event indicating a channel over which the communication attempt is received, and another communication event indicating a recipient device to which the communication attempt is directed;
   for each communication event, determining a quantitative value defining an event weight corresponding to said communication event;
   comparing said event weight with an event threshold associated with said communication event to determine whether said event weight exceeds said event threshold;
   responsive to said comparing step, performing at least one communication management action;
   detecting an event exception;
   responsive to detecting an event exception, adjusting at least one of said event weight and said event threshold based upon said event exception, wherein if said event exception comprises receiving more than a predetermined number of email communication attempts within a predetermined time interval or if said event exception comprises determining that a communication source has been waiting in a queue for longer than a predetermined time interval, then said event weight is increased by a predetermined factor;
   detecting a management control condition; and,
   responsive to detecting a management control condition, temporarily adjusting at least one of said event weight and said event threshold, wherein if said management control condition comprises receiving a communication attempt while a communication recipient is communicating over a telephone channel or receiving a communication attempt during a designated time period, then said event threshold is increased by a predetermined factor.

2. The method of claim 1, wherein said communication management action includes at least one action selected from the group consisting of a busy indication action, a queuing action, an automated response action, a linking action, a notification action, and a reformat action.

3. The method of claim 1, further comprising the step of:
   receiving a plurality of said communication attempts from a plurality of source devices, said source devices being associated with a selected one of said communication sources.

4. The method of claim 1, wherein different ones of said communication attempts are associated with different communication channels.

5. The method of claim 1, further comprising the step of:
   determining said event weight based at least in part upon an identity of said communication source.

6. The method of claim 1, further comprising the steps of:
   intercepting said communication attempt before a connection is established with an intended communication recipient.

7. The method of claim 6, wherein said communication attempt is intended for a specific recipient device associated with a communication recipient, said method further comprising the step of:
   performing at least one communication management action that utilizes at least one recipient device associated with said communication recipient which is different from said specific recipient device.

8. The method of claim 1, further comprising the steps of:
   providing a plurality of event thresholds for at least one of said communication events, each event threshold having an associated communication action.

9. The method of claim 1, further comprising the step of:
   responsively adjusting at least one of said event weight and said event threshold based upon said event exception.

10. The method of claim 1, further comprising the step of:
    temporarily adjusting at least one of said event weight and said event threshold responsive to said management control condition.

11. A system for managing communications comprising:
    a communication manager configured to intercept incoming communications before said communications reach an intended recipient and for each communication intercepted, responsively determining a plurality of corresponding communication events, the plurality of communication events comprising a communication event indicating a communication source of the communication, another communication event indicating a channel over which the communication is received, and another communication event indicating a recipient device to which the communication is directed, wherein said communication manager is configured to determine for each communication event a quantitative value defining an event weight and to automatically perform a plurality of communication actions responsive to said incoming communications, each of said communication actions being responsively performed based upon a comparison of at least one corresponding event weight to at least one predetermined threshold value, each action being performed if at least one corresponding event weight exceeds said at least one predetermined threshold value;

wherein the communication manager is also configured to detect an event exception and, responsive to detecting an event exception, adjust at least one of said event weight and said at least one predetermined threshold value based upon said event exception, wherein if said event exception comprises receiving more than a predetermined number of email communication attempts within a predetermined time interval or if said event exception comprises determining that a communication source has been waiting in a queue for longer than a predetermined time interval, then said event weight is increased by a predetermined factor;

wherein the communication manager is also configured to detect a management control condition and, responsive to detecting a management control condition, temporarily adjust at least one of said event weight and said at least one predetermined threshold value, wherein if said management control condition comprises receiving a communication attempt while a communication recipient is communicating over a telephone channel or receiving a communication attempt during a designated time period, then an event threshold is increased by a predetermined factor.

12. The system of claim 11, wherein different ones of said incoming communications are associated with different communication channels.

13. The system of claim 12, further comprising:
an integrator configured to notify said intended recipient of at least a portion of said incoming communications, wherein said notification occurs via a single interface, and wherein said portion of said incoming communication can be targeted for different receiving communication devices.

14. A system for managing communications comprising the steps of:
means for receiving a plurality of communication attempts from a plurality of communication sources;
means for responsively determining a plurality of corresponding communication events for each communication attempt, the plurality of communication events comprising, for each communication attempt, a communication event indicating a communication source of the communication attempt, another communication event indicating a channel over which the communication attempt is received, and another communication event indicating a recipient device to which the communication attempt is directed;
means for determining a quantitative value defining an event weight corresponding to an event weight for each communication event;
means for comparing said event weight with an event threshold associated with said communication event to determine whether said event weight exceeds said event threshold; and,
means for responsive to said comparing step, performing at least one communication management action
means for detecting an event exception and, in response to detecting an event exception, adjusting at least one of said event weight and said event threshold based upon said event exception, wherein if said event exception comprises receiving more than a predetermined number of email communication attempts within a predetermined time interval or if said event exception comprises determining that a communication source has been waiting in a queue for longer than a predetermined time interval, then said event weight is increased by a predetermined factor;

means for detecting a management control condition and, in response to detecting a management control condition, temporarily adjusting at least one of said event weight and said event threshold, wherein if said management control condition comprises receiving a communication attempt while a communication recipient is communicating over a telephone channel or receiving a communication attempt during a designated time period, then said event threshold is increased by a predetermined factor.

15. A machine-readable storage having stored thereon, a computer program having a plurality of code sections, said code sections executable by a machine for causing the machine to perform the steps of:
receiving a plurality of communication attempts from a plurality of communication sources;
for each communication attempt, responsively determining a plurality of corresponding communication events, the plurality of communication events comprising, for each communication attempt, a communication event indicating a communication source of the communication attempt, another communication event indicating a channel over which the communication attempt is received, and another communication event indicating a recipient device to which the communication attempt is directed;
for each communication event, determining a quantitative value defining an event weight corresponding to said communication event;
comparing said event weight with an event threshold associated with said communication event to determine whether said event weight exceeds said event threshold;
responsive to said comparing step, performing at least one communication management action;
detecting an event exception;
responsive to detecting an event exception, adjusting at least one of said event weight and said event threshold based upon said event exception, wherein if said event exception comprises receiving more than a predetermined number of email communication attempts within a predetermined time interval or if said event exception comprises determining that a communication source has been waiting in a queue for longer than a predetermined time interval, then said event weight is increased by a predetermined factor;
detecting a management control condition; and,
responsive to detecting a management control condition, temporarily adjusting at least one of said event weight and said event threshold, wherein if said management control condition comprises receiving a communication attempt while a communication recipient is communicating over a telephone channel or receiving a communication attempt during a designated time period, then said event threshold is increased by a predetermined factor.

16. The machine-readable storage of claim 15, wherein said communication management action includes at least one action selected from the group consisting of a busy indication action, a queuing action, an automated response action, a linking action, a notification action, and a reformat action.

17. The machine-readable storage of claim 15, further comprising the step of:

receiving a plurality of said communication attempts from a plurality of source devices, said source devices being associated with a selected one of said communication sources.

18. The machine-readable storage of claim 15, wherein different ones of said communication attempts are associated with different communication channels.

19. The machine-readable storage of claim 15, further comprising the step of:
   determining said event weight based at least in part upon an identity of said communication source.

20. The machine-readable storage of claim 15, further comprising the steps of:
   intercepting said communication attempt before a connection is established with an intended communication recipient.

21. The machine-readable storage of claim 20, wherein said communication attempt is intended for a specific recipient device associated with said communication recipient, said machine-readable storage further comprising the step of:
   performing at least one communication management action that utilizes at least one recipient device associated with a communication recipient which is different from said specific recipient device.

22. The machine-readable storage of claim 15, further comprising the steps of:
   providing a plurality of event thresholds for at least one of said communication events, each event threshold having an associated communication action.

23. The machine-readable storage of claim 15, further comprising the step of:
   responsively adjusting at least one of said event weight and said event threshold based upon said event exception.

24. The machine-readable storage of claim 15, further comprising the step of:
   temporarily adjusting at least one of said event weight and said event threshold responsive to said management control condition.

* * * * *